United States Patent
Kim et al.

(10) Patent No.: US 10,019,802 B2
(45) Date of Patent: Jul. 10, 2018

(54) GRAPHICS PROCESSING UNIT

(71) Applicant: SAMSUNG ELECTRONICS CO., LTD., Suwon-si (KR)

(72) Inventors: Hong Yun Kim, Suwon-si (KR); Chang Hyo Yu, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 316 days.

(21) Appl. No.: 14/617,076

(22) Filed: Feb. 9, 2015

(65) Prior Publication Data
US 2015/0228111 A1   Aug. 13, 2015

(30) Foreign Application Priority Data

Feb. 7, 2014   (KR) .................. 10-2014-0014394

(51) Int. Cl.
| G06T 7/20 | (2017.01) |
| G06T 7/00 | (2017.01) |
| G06T 1/20 | (2006.01) |
| G06T 7/50 | (2017.01) |
| G06T 15/00 | (2011.01) |
| G06T 11/40 | (2006.01) |

(52) U.S. Cl.
CPC .............. *G06T 7/0051* (2013.01); *G06T 1/20* (2013.01); *G06T 7/50* (2017.01); *G06T 11/40* (2013.01); *G06T 15/005* (2013.01)

(58) Field of Classification Search
None
See application file for complete search history.

(56) References Cited

U.S. PATENT DOCUMENTS

| 7,551,178 B2 | 6/2009 | Chung et al. |
| 7,920,141 B2 | 4/2011 | Leather |
| 8,089,486 B2 | 1/2012 | Anderson et al. |
| 8,139,058 B2 | 3/2012 | Cai et al. |
| 8,300,045 B2 | 10/2012 | Kim |
| 8,463,070 B2 | 6/2013 | Takemoto |
| 2008/0024497 A1 | 1/2008 | Crow et al. |
| 2011/0164038 A1 | 7/2011 | Jung et al. |
| 2013/0155103 A1 | 6/2013 | Kakarlapudi et al. |

(Continued)

FOREIGN PATENT DOCUMENTS

KR   10-1136737 B1   4/2012

OTHER PUBLICATIONS

Braugh (Braugh, Jerry, "Rasterization on Larrabee", https://software.intel.com/en-us/articles/rasterization-on-larrabee, Aug. 25, 2011).*

*Primary Examiner* — William A Beutel
(74) *Attorney, Agent, or Firm* — Sughrue Mion, PLLC

(57) ABSTRACT

A graphics processing unit (GPU) that performs rendering in units of tiles includes a coefficient generator that produces an interpolation coefficient based on coordinates of vertices of a primitive included in a first tile and a second tile; an interpolator that produces barycentric coordinates in respective pixels for the first tile of the primitive and pixel values in the first tile corresponding to the primitive, based on the interpolation coefficient, and a storage configured to store the interpolation coefficient. The GPU produces barycentric coordinates in and pixel values of respective pixels for a second tile of the primitive, based on the interpolation coefficient stored in the storage.

12 Claims, 15 Drawing Sheets

(56) References Cited

U.S. PATENT DOCUMENTS

2014/0362101 A1* 12/2014 Cerny ................. G06T 1/60
  345/589
2015/0022525 A1* 1/2015 Grenfell ............. G06T 15/005
  345/427

* cited by examiner

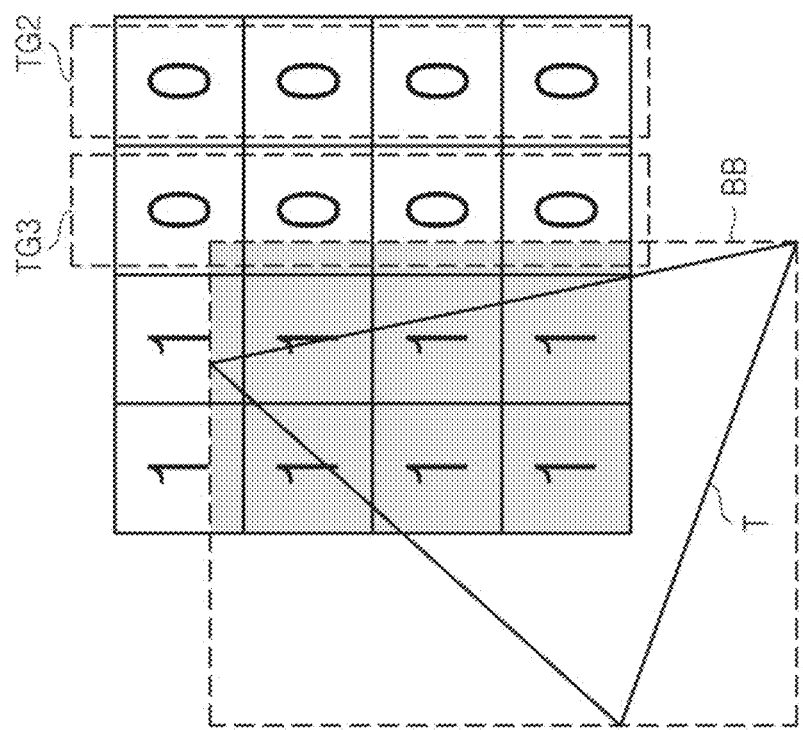
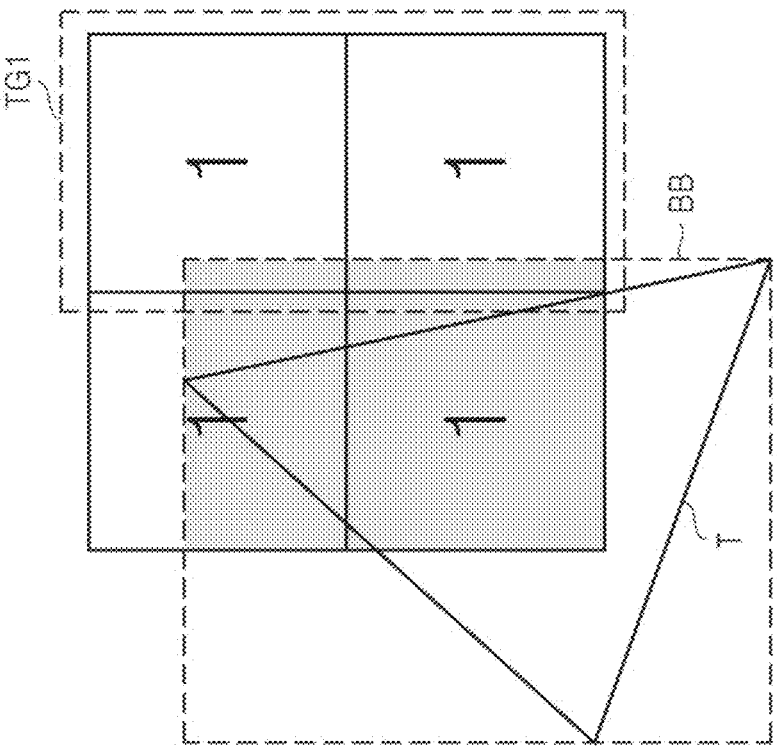

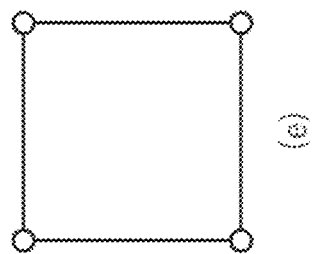
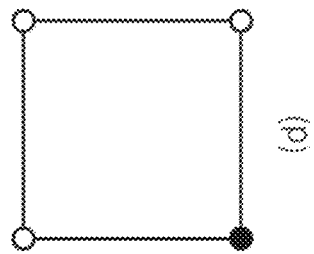
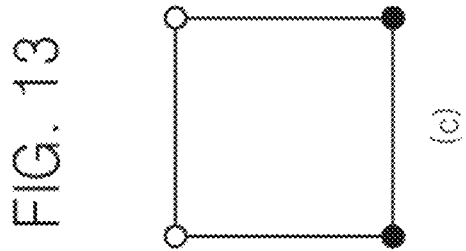
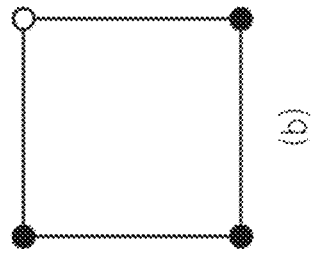
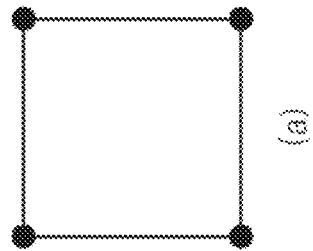
FIG. 13

GRAPHICS PROCESSING UNIT

CROSS-REFERENCE TO RELATED APPLICATIONS

This application claims priority from Korean Patent Application No. 10-2014-0014394, filed on Feb. 7, 2014, in the Korean Intellectual Property Office, the disclosure of which is incorporated by reference herein in its entirety.

BACKGROUND

1. Technical Field

Apparatuses, devices, methods and articles of manufacture consistent with the present disclosure relate to a graphics processing unit (GPU).

2. Description of the Related Art

A GPU that performs rendering in units of tiles generates pixel values in a primitive covering target tiles (e.g., color, depth values, etc.) by using a rasterizer.

When a primitive covers a plurality of tiles, the primitive is repeatedly allocated to the plurality of tiles and thus the size of a primitive list allocated to each of the plurality of tiles increases. To reduce the size of the primitive list, a hierarchical tile may be formed by allocating the primitive allocated to the plurality of tiles to a higher-level tile (a larger tile including the plurality of tiles).

However, when primitives cover a plurality of tiles, the GPU repeatedly performs the same operation on the same primitive whenever the plurality of tiles are individually rendered.

SUMMARY

According to an aspect of an exemplary embodiment, a graphics processing unit (GPU) that performs rendering in units of tiles includes a first coefficient generator configured to produce an interpolation coefficient based on coordinates of vertices of a primitive included in a first tile and a second tile; an interpolator configured to produce barycentric coordinates for interpolating pixel values (e.g., color values, texture coordinates, a normal vector, etc.) of respective pixels for the first tile of the primitive, based on the interpolation coefficient, and to perform interpolation; and a storage configured to store the interpolation coefficient. The GPU produces pixel values in respective pixels for a second tile of the primitive, based on the interpolation coefficient stored in the storage.

The first tile may be larger in size than the second tile, and the first tile may include the second tile.

The vertices may comprise at least two vertices, and the interpolation coefficient may be a value based on a difference between the coordinates of the at least two vertices of the primitive.

The primitive may be a triangle. The interpolation coefficient may include at least one among N, |N|, N/|N|, (V1−V2), (V0−V1), and (V2−V0), where V0, V1, and V2 may denote vectors corresponding to the respective vertices of the primitive, 'N' may be a vector that is equal to (V2−V0)×(V1−V0), and |N| may denote a size of the vector N.

The graphics processing unit may further include a depth information generator configured to calculate depth information for the first tile of the primitive. The storage may store the depth information. The graphics processing unit may perform rasterization on the second tile based on the depth information stored in the storage.

The graphics processing unit may further include a second coefficient generator configured to produce an interpolation coefficient based on the coordinates of the vertices of the primitive included in the first tile and the second tile. The barycentric coordinates in the respective pixels in the second tile may be produced based on the interpolation coefficient produced by the first coefficient generator or the second coefficient generator.

The graphics processing unit may further include a coverage check information generator configured to calculate coverage information for a third tile of the primitive, based on geometric information for the first tile of the primitive. The storage may further store the coverage information.

The first tile may be larger in size than the third tile and the first tile may include the third tile; or the first tile may be smaller in size than the third tile, and the first time may be included in the third tile. The first tile may have a same size as a size of the third tile.

The geometric information may be information indicating whether vertices of the first tile are within the primitive.

The GPU may process the first tile and the third tile by using a same core or different cores.

The storage may be embodied as a cache memory or a buffer memory.

According to another aspect of an exemplary embodiment, a GPU that performs rendering in units of tiles includes a rasterizer configured to, based on geometric information for a first tile of a primitive; calculate coverage information for a second tile of the primitive; and a storage configured to store the coverage information. The rasterizer performs rasterization on the second tile, based on the coverage information stored in the storage.

The second tile may be either a tile that is included in the first tile and is lower by N levels than the first tile, or a tile that includes the first tile and is higher by N levels than the first tile, wherein N denotes an integer that is equal to or greater than '1'.

The calculating of the coverage information and the rasterization may be performed by a same core or different cores.

The rasterizer may calculate depth information for the first tile of the primitive and the storage may store the depth information. The rasterizer may perform rasterization for the second tile based on the depth information stored in the storage.

BRIEF DESCRIPTION OF THE DRAWINGS

Exemplary embodiments will be more clearly understood from the following detailed description taken in conjunction with the accompanying drawings in which:

FIG. 10A illustrates an example of coverage information generated according to the related art; and FIG. 10B illustrates an example of coverage information generated according to an exemplary embodiment;

FIG. 13 illustrates in-out patterns of a tile with respect to a primitive;

DETAILED DESCRIPTION

Figure 1:
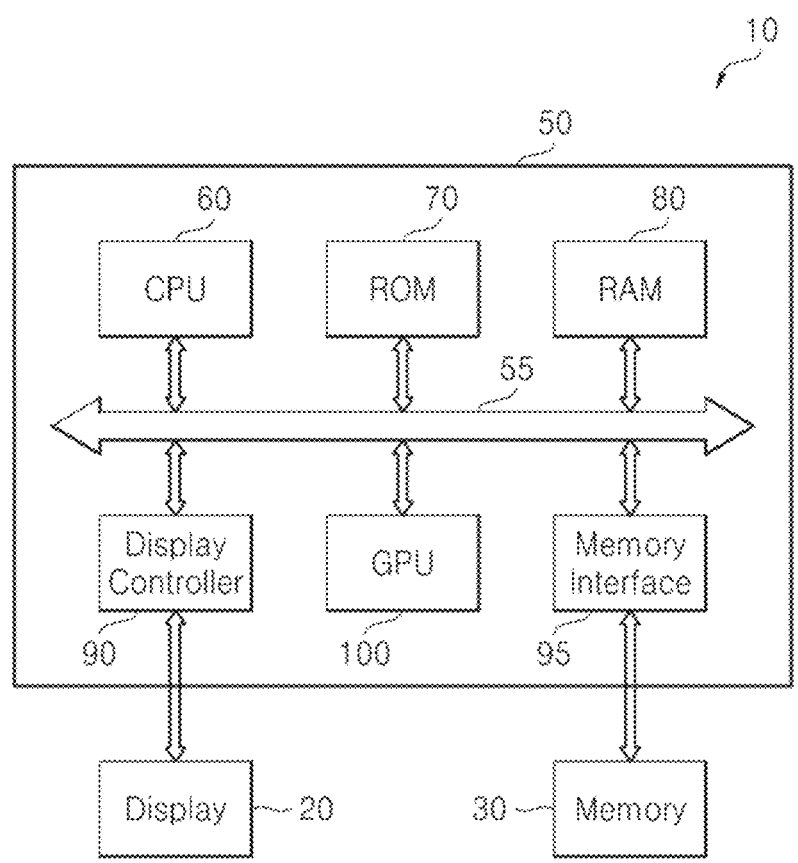
FIG. 1 is a block diagram of a data processing system including a graphics processing unit (GPU) according to an exemplary embodiment.

Exemplary embodiments now will be described more fully hereinafter with reference to the accompanying drawings, in which various exemplary embodiments are shown. The inventive concept may, however, be embodied in many different forms and should not be construed as limited to the exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

A primitive means an element (such as a line, a circle, a triangle, a curve, or a polygon) that may be drawn, stored, and modified as an individual substance according to a graphics program in computer graphics so as to create a graphic design. In graphic processing, a plane is divided into a plurality of basic elements, i.e., primitives. In general, a primitive is expressed as a simple polygon, such as a triangle, and described by defining the vertices of the triangle. In the disclosure that follows, a triangle is used as an example. However, one of ordinary skill in the art will appreciate that the same description will apply to other polygons, for example, a square or rectangle or pentagon described by defining corners of the square or rectangle or pentagon, or other polygons described by similar corners or connecting points.

Rendering means a process of creating an image from a model by using a computer program. Here, the model is a description regarding a three-dimensional (3D) object structured in a strongly defined language or data structure, and may include geometry, viewpoints, texture mapping information, lighting information, shading information, etc. Rendering may be also understood as a process of calculating an effect of an image editing file to produce a final video output.

A rendering device draws a polygon from a 3D model in the form of a two-dimensional (2D) image. A frame-based rendering device draws a whole frame buffer at a time. However, it is more efficient to divide a screen into subregions, i.e., tiles, and render the tiles. The tiles may be rendered sequentially. In such a case, the screen is generally divided into tiles having a same size and shape.

A tile may include a plurality of polygons. In a tile-based rendering device, it is advantageous that an invisible primitive be not included in a given tile. Thus, a list is prepared for each tile in order to perform the tile-based rendering method. The list is also called a tile-list, a primitive-list, or a display list. The display list includes primitives to be drawn in respective regions.

In the present disclosure, a primitive will be referred to as a triangle and the display list will be referred to as a triangle list for convenience of explanation, but as discussed above, exemplary embodiments of the inventive concept are not limited thereto.

FIG. 1 is a block diagram of a data processing system 10 including a graphic processing unit (GPU) 100 according to an exemplary embodiment. Referring to FIG. 1, the data processing system 10 may include a data processing device 50, a display 20, and a memory 30.

The data processing system 10 may be embodied as a personal computer (PC), a portable electronic device (or a mobile device), or an electronic device including the display 20 capable of displaying image data.

The portable electronic device may be embodied as a laptop computer, a mobile phone, a smartphone, a tablet personal computer (PC), a mobile internet device (MID), a personal digital assistant (PDA), an enterprise digital assistant (EDA), a digital still camera, a digital video camera, a portable multimedia player (PMP), a personal/portable navigation device (PND), a handheld game console, or an e-book, etc.

The data processing device 50 may control the display 20 and/or the memory 30. That is, the data processing device 50 may control overall operations of the data processing system 10. The data processing device 50 may be embodied as a printed circuit board (PCB) such as a motherboard, an integrated circuit (IC), or a system-on-chip (SoC). For example, the data processing device 50 may be an application processor.

The data processing device 50 may include a central processing unit (CPU) 60, a read only memory (ROM) 70, a random access memory (RAM) 80, a display controller 90, a memory interface 95, and a graphics processing unit (GPU) 100.

The CPU 60 may control overall operations of the data processing device 50. For example, the CPU 60 may control operations of the ROM 70, the RAM 80, the display controller 90, the memory interface 95, and the GPU 100. That is, the CPU 60 may communicate with the ROM 70, the RAM 80, the display controller 90, the memory interface 95, and the GPU 100 via a bus 55.

The CPU 60 is capable of reading and executing program instructions.

For example, programs and/or data stored in the ROM 70, the RAM 80, and/or the memory 30 may be loaded to a memory included in the CPU 60, e.g., a cache memory (not shown), under control of the CPU 60.

In some exemplary embodiments, the CPU 60 may be embodied as a multi-core. The multi-core is a computing component including two or more independent cores.

The ROM 70 may permanently store programs and/or data.

In some exemplary embodiments, the ROM 70 may be embodied as an erasable programmable read-only memory (EPROM) or an electrically erasable programmable ROM (EEPROM).

The RAM 80 may temporarily store programs, data, and/or instructions. For example, the programs and/or data stored in the ROM 70 and/or the memory 30 may be temporarily stored in the RAM 80 under control of the CPU 60 or the GPU 100 or according to booting code stored in the ROM 70.

In some exemplary embodiments, the RAM 80 may be embodied as a dynamic RAM (DRAM) or a static RAM (SRAM).

The GPU 100 may perform an operation related to graphic processing so as to reduce the load on the CPU 60.

The display controller 90 may control an operation of the display 20.

For example, the display controller 90 may transmit image data (e.g., still image data, moving image data, three-dimensional (3D) image data, and/or stereoscopic 3D image data) output from the memory 30 to the display 20.

The memory interface 95 may perform a memory controller function of accessing the memory 30. For example, the data processing device 50 and the memory 30 may communicate with each other via the memory interface 95. That is, the data processing device 50 and the memory 30 may exchange data with each other via the memory interface 95.

The display 20 (also referred to as a screen) may display an image corresponding to the image data output from the display controller 90. The display 20 may include a pixel array.

For example, the display 20 may be embodied as a touch screen, a liquid crystal display (LCD), a thin-film transistor-liquid crystal display (TFT-LCD), a light emitting diode (LED) display, an organic LED (OLED) display, an active matrix OLED (AMOLED) display, or a flexible display, etc.

The memory 30 may store programs and/or data (or image data) to be processed by the CPU 60 and/or the GPU 100.

The memory 30 may be embodied as a volatile memory device or a non-volatile memory device.

The volatile memory device may be embodied as a DRAM, an SRAM, a thyristor RAM (T-RAM), a zero capacitor RAM (Z-RAM), or a twin transistor RAM (TTRAM), etc.

The non-volatile memory device may be embodied as an EEPROM, a flash memory, a magnetic RAM (MRAM), a spin-transfer torque (STT)-MRAM, a conductive bridging RAM (CBRAM), a ferroelectric RAM (FeRAM), a phase-change RAM (PRAM), a resistive RAM (RRAM), a nano-tube RRAM, a polymer RAM (PoRAM), a nano floating gate memory (NFGM), a holographic memory, a molecular electronics memory device, or an insulator resistance change memory, etc.

The non-volatile memory device may be embodied as a flash-based memory device, e.g., a secure digital (SD) card, a multimedia card (MMC), an embedded-MMC (eMMC), a universal serial bus (USB) flash drive, or a universal flash storage (UFS), etc.

Also, the non-volatile memory device may be embodied as a hard disk drive (HDD) or a solid-state drive (SSD), etc.

Figure 2:
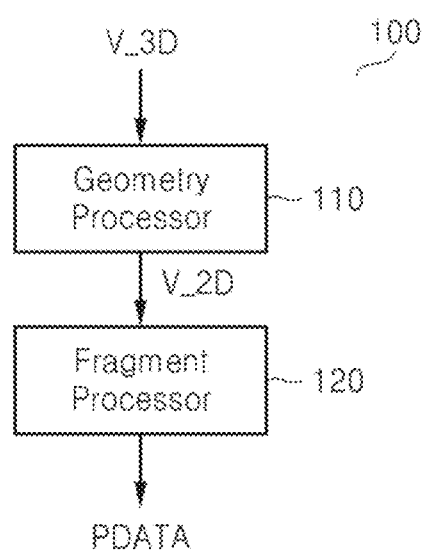
FIG. 2 is a block diagram of the GPU of FIG. 1.

FIG. 2 is a block diagram of the GPU 100 of FIG. 1. Referring to FIGS. 1 and 2, the GPU 100 may include a geometry processor 110 and a fragment processor 120.

The GPU 100 receives data output from the memory 30 via the CPU 60 and/or the memory interface 95, and transmits data processed by the GPU 100 to the memory 30. For convenience of explanation, the CPU 60 and the memory interface 95 are not described in detail here.

The GPU 100 may receive information regarding an object in a 3D space and draw the object in a 2D space. The object in the 3D space may include a plurality of vertices.

The geometry processor 110 may receive vertex information V_3D in the 3D space, and coordinate-transform the vertex information V_3D in the 3D space into vertex information V_2D in the 2D space.

The fragment processor 120 may generate pixel data PDATA based on the vertex information V_2D in the 2D space. For example, the fragment processor 120 may configure primitives based on the vertex information V_2D in the 2D space, and determine values of pixels by determining a pixel that each of the primitives overlaps.

Figure 3:
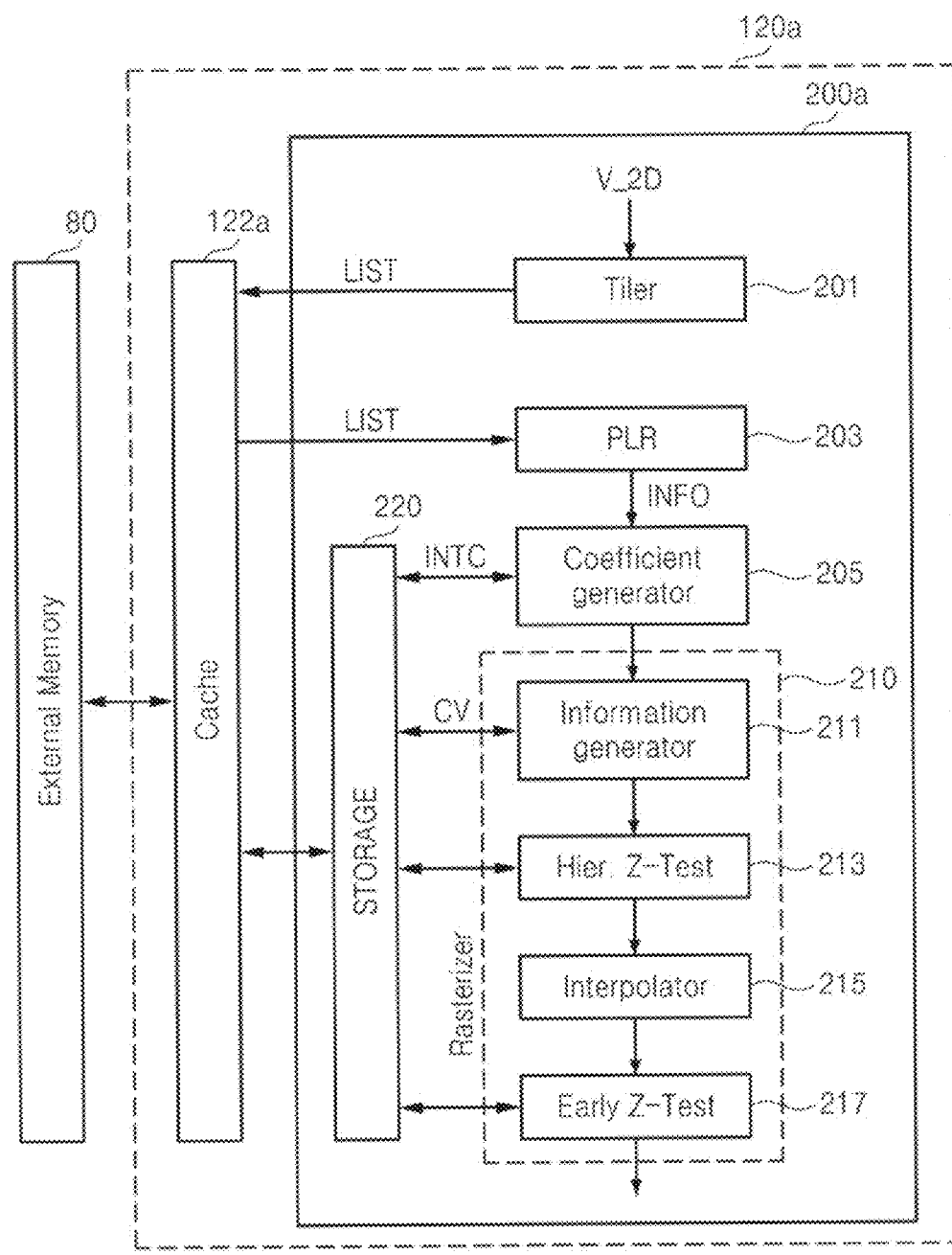
FIG. 3 is a block diagram of a fragment processor of the GPU of FIG. 2, according to an exemplary embodiment.
Figure 4:
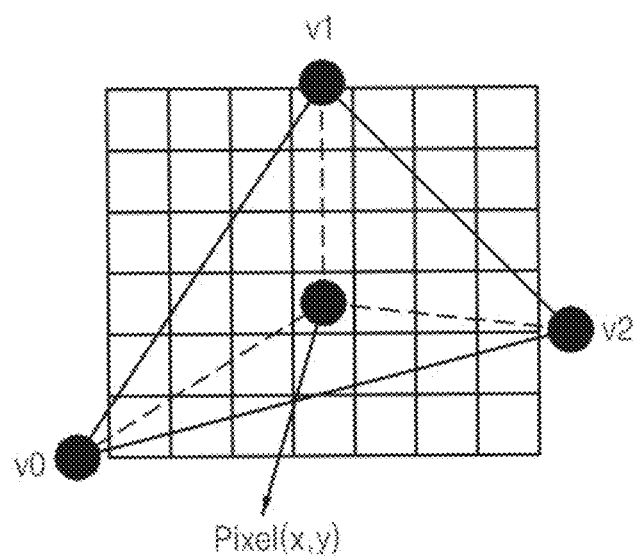
FIG. 4 is a diagram illustrating a method of calculating values of pixels in a primitive according to an exemplary embodiment.
Figure 5:
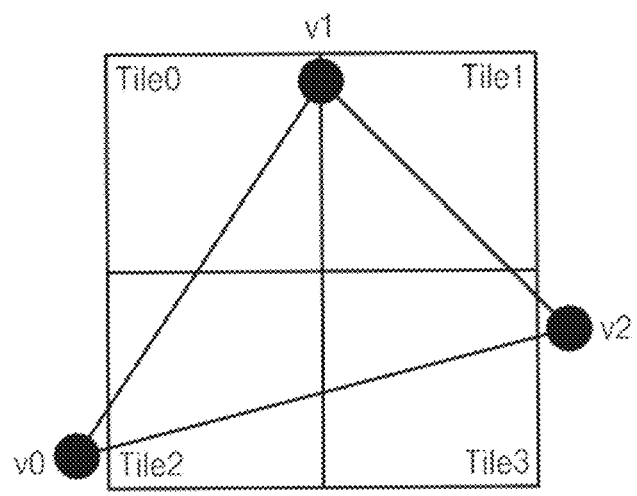
FIG. 5 illustrates tiles to which a same interpolation coefficient is applied.

FIG. 3 is a block diagram of a fragment processor 120*a* of the fragment processor 120 of the GPU of FIG. 2, according to an exemplary embodiment. FIG. 4 is a diagram illustrating a method of calculating values of pixels in a primitive according to an exemplary embodiment. FIG. 5 illustrates tiles to which a same interpolation coefficient is applied.

Referring to FIGS. 1 to 5, the fragment processor 120*a* may include a cache 122*a* and a core 200*a*.

The cache 122*a* may be a level-2 (L2) cache. The cache 122*a* may exchange data with an external memory, e.g., the ROM 70 or the RAM 80 of FIG. 1.

The core 200*a* may include a tiler 201, a primitive list reader (PLR) 203, a coefficient generator 205, a rasterizer 210, and a storage 220. The storage 220 may be a rasterizer memory.

The tiler 201 may receive vertex information V_2D in a 2D space, generate a list LIST for each of the tiles, and output the list LIST to the cache 122*a*.

The PLR 203 may receive the list LIST for each of the tiles, and sequentially output information INFO regarding each of polygons included in the list LIST to the coefficient generator 205. The information INFO regarding each of the polygons may include values of the respective vertices of the polygon, e.g., coordinates, a color value, a depth value, a normal vectors, etc.

The coefficient generator 205 may generate information for calculating barycentric coordinates BC in each of pixels for the tiles of the polygons, based on the information INFO regarding each of the polygons. For example, each of the polygons may be included in a plurality of tiles (e.g., a first tile and a second tile). When the core 200a processes the first tile, the coefficient generator 205 may generate an interpolation coefficient INTC based on the coordinates of vertices of a polygon. An interpolator 215 may generate barycentric coordinates BC in each of pixels for the first tile of the polygon, based on the interpolation coefficient INTC.

For example, in a case in which the polygon is a triangle as shown in FIG. 4, it is assumed that vectors toward three vertices of the triangle with respect to a reference point are V0, V1, and V2, and values (e.g., color values or depth values) at the three vertices are v0, v1, and v2. In this case, a pixel value Pixel(x,y) at coordinates (x, y) included in the triangle may be calculated by Equation 1 below.

$$\text{Pixel}(x, y) = v0*\alpha + v1*\beta + v2*\gamma, \; \alpha + \beta + \gamma = 1. \quad \text{[Equation 1]}$$

$$\gamma = \frac{N \cdot N_3}{\|N\|}, \; \alpha = \frac{N \cdot N_1}{\|N\|}, \; \beta = \frac{N \cdot N_2}{\|N\|}$$

$$N = (V2-V0) \times (V1-V0),$$

$$N_1 = (V1-V2) \times (P-V2),$$

$$N_2 = (V0-V1) \times (P-V1),$$

$$N_3 = (V2-V0) \times (P-V0).$$

In Equation 1, '$\alpha$', '$\beta$', and '$\gamma$' denote barycentric coordinates BC in the respective pixels, and '$\|N\|$' (or $|N|$) denotes the size of a vector N.

A coefficient calculated during the calculation of the barycentric coordinates BC and having the same value regardless of the positions of the pixels is defined as an interpolation coefficient INTC. The interpolation coefficient INTC may be a value based on the differences between the coordinates of the vertices.

Referring to Equation 1, the vectors V0, V1, and V2 are the same for each of the pixels and thus the vector N, N/|N|, the size |N| of the vector V, the differences between the vectors V0, V1, and V2, i.e., (V1−V2), (V0−V1), and (V2−V0), are also the same for each of the pixels. The interpolation coefficient INTC may include at least one among these values.

The storage 220 may store the interpolation coefficient INTC. The storage 220 may be embodied as a cache memory or a buffer memory.

when the core 200a processes the second tile, the coefficient generator 205 may receive the interpolation coefficient INTC stored in the storage 220 when at least a portion of the second tile is included in the polygon. When the coefficient generator 205 receives the interpolation coefficient INTC, the interpolation coefficient INTC for the polygon may not be generated again. The interpolator 215 may generate barycentric coordinates BC in each of pixels for the second tile of the polygon, based on the interpolation coefficient INTC received from the storage 220 or the coefficient generator 205.

In some exemplary embodiments, the first tile may be an upper tile of the second tile. That is, the first tile may be larger in size than the second tile and include the second tile, but exemplary embodiments are not limited thereto.

For example, in the case of a triangle as shown in FIG. 5, when the triangle covers four tiles, e.g., tiles Tile0, Tile1, Tile2, and Tile3, interpolation coefficients INTC for an upper tile including the four tiles. In the related art, the four tiles are individually calculated. Thus, in the case of the related art, a 32-bit floating point-based 3×3 cross product is performed to calculate the vector N and a division operation requiring a long latency is performed to calculate N/|N|.

By contrast, according to exemplary embodiments, the interpolation coefficient INTC for the triangle may be stored in the storage 220 and be read whenever the same triangle is loaded so as to reduce the amount of calculation, thereby performing an operation at a high speed with low power consumption.

The rasterizer 210 may sequentially receive information regarding a polygon covering tiles and produce values of respective pixels in the tiles.

In some exemplary embodiments, the rasterizer 210 may include a coverage check information generator 211, a hierarchical Z-test 213, an interpolator 215, and an early Z-test 217.

The coverage check information generator 211 may calculate coverage information CV for a second tile of the polygon, based on geometric information for the first tile of the polygon in the first tile. The coverage information CV is information indicating whether at least a portion of the second tile is included in the polygon. For convenience of explanation, a method of calculating the coverage information CV will be described later in more detail with reference to FIGS. 10 to 13 below.

The geometric information may be information indicating whether the vertices of the first tile are included in the polygon.

In a hierarchical tile structure, the second tile may a tile at a lower layer that is lower by N levels than a layer of the first tile. Here, 'N' denotes an integer that is equal to or greater than '1'. That is, the first tile may be larger in size than the second tile and the first tile may include the second tile.

In other exemplary embodiments, the second tile may be at the same layer as the first tile. That is, the first tile may have a same size as a size of the second tile.

The storage 220 may store the coverage information CV.

The hierarchical Z-test (Hier. Z-Test) 213 may compare depth information of the polygon in units of tiles.

The interpolator 215 may produce barycentric coordinates BC in each of pixels for the first tile of the polygon based on the interpolation coefficient INTC, and interpolate the values of the vertices of the polygon based on the barycentric coordinates BC to produce pixel values in the polygon. The pixel values may be, for example, a color value, texture coordinates, a normal vector, etc.

The early Z-test 217 may compare depth information of the polygon in units of pixels.

When the second tile is processed, the rasterizer 210 may perform rasterization on the second tile based on the coverage information CV stored in the storage 220.

In some exemplary embodiments, when the core 200a processes the first tile, the hierarchical Z-test 213 or the early Z-test 217 may calculate depth information for the first tile of a primitive. The storage 220 may store the depth information calculated by the hierarchical Z-test 213 or the early Z-test 217. When the core 200a processes the second tile, the rasterizer 210 may perform rasterization on the second tile based on the depth information stored in the storage 220. In some exemplary embodiments, the first tile and the second tile may be processed by different cores.

The core 200a may additionally process an output of the rasterizer 210 to produce pixel data PDATA. For example, the core 200a may further perform an arithmetic operation, such as texture mapping or color format conversion, on the output of the rasterizer 210 to process a color or shading effect on a plurality of pixels.

Figure 6:
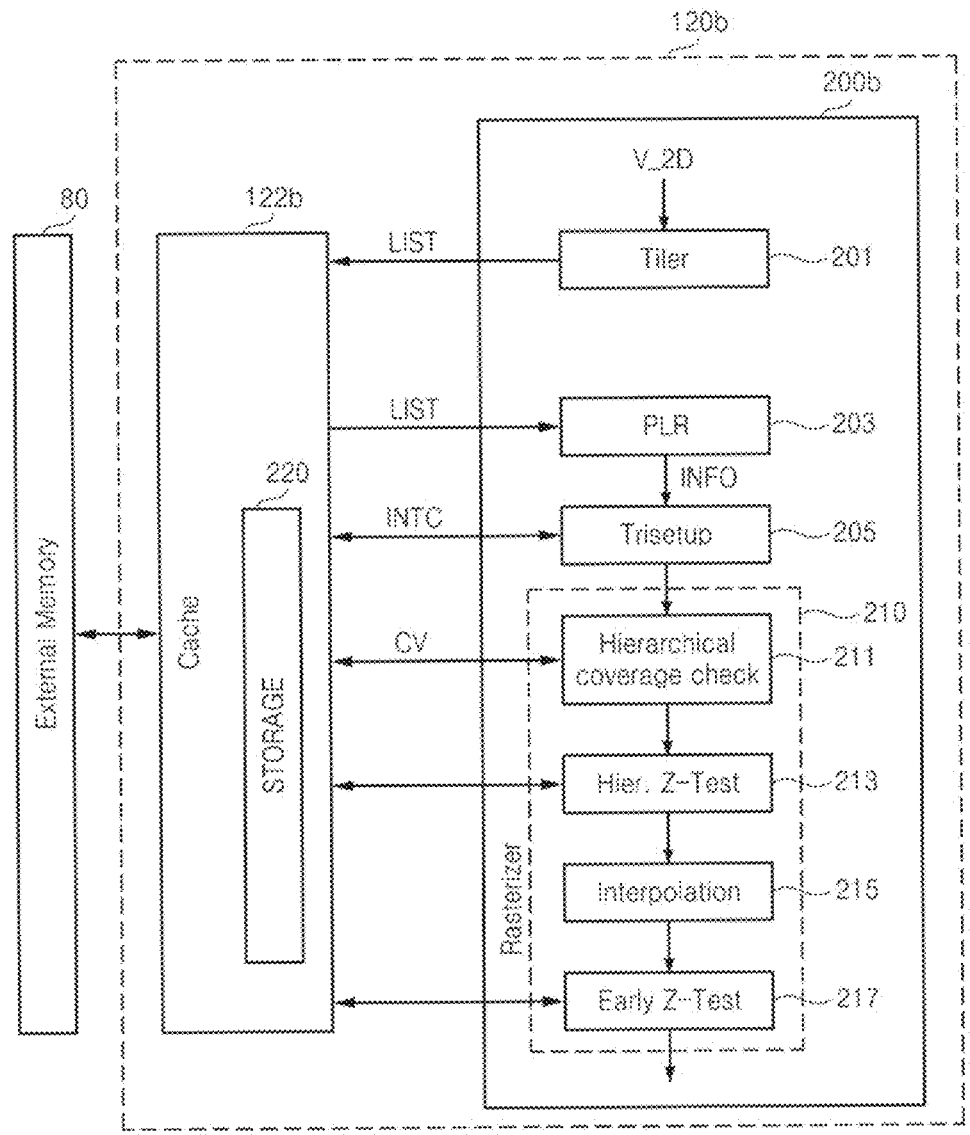
FIG. 6 is a block diagram of a fragment processor of the GPU of FIG. 2, according to another exemplary embodiment.

FIG. 6 is a block diagram of a fragment processor 120b of the fragment processor 120 of the GPU of FIG. 2, according to another exemplary embodiment. The fragment processor 120b of FIG. 6 has substantially the same structure as the fragment processor 120a of FIG. 3 and will be thus described below by focusing on differences from the fragment processor 120a for convenience of explanation.

Referring to FIG. 6, a storage 220 may be included in a cache 122b rather than in the core 200b, unlike in the fragment processor 120a of FIG. 3.

Figure 7:
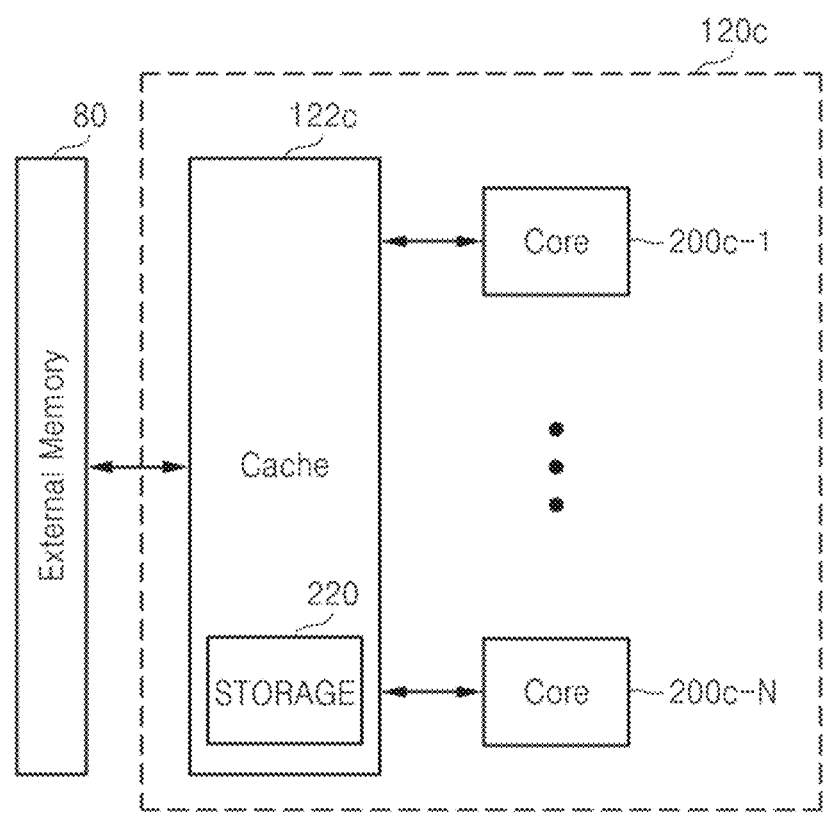
FIG. 7 is a block diagram of a fragment processor of the GPU of FIG. 2, according to yet another exemplary embodiment.

FIG. 7 is a block diagram of a fragment processor 120c of the fragment processor 120 of the GPU of FIG. 2 according to yet another exemplary embodiment. The fragment processor 120c of FIG. 7 has substantially the same structure as the fragment processor 120b of FIG. 6 and will be thus described below by focusing on differences from the fragment processor 120b for convenience of explanation.

Referring to FIGS. 2, 6, and 7, the fragment processor 120c may include a plurality of cores 200c-1 to 200c-N and a cache 122c.

The cache 122c may include a storage 220. The storage 220 may be a rasterizer memory. The cores 200c-1 to 200c-N may have the substantially the same structure as the core 200b of FIG. 6.

The cores 200c-1 to 200c-N may process different tiles. Operations of the cores 200c-1 to 200c-N may be performed in parallel.

In some exemplary embodiments, when the first core 200c-1 stores an interpolation coefficient of a polygon or coverage information for a second tile of the polygon in the storage 220 while processing a first tile, the second core 200c-2 may read the interpolation coefficient or the coverage information from the storage 220. The second core 200c-2 may process the second tile based on the read interpolation coefficient or coverage information.

Figure 8:
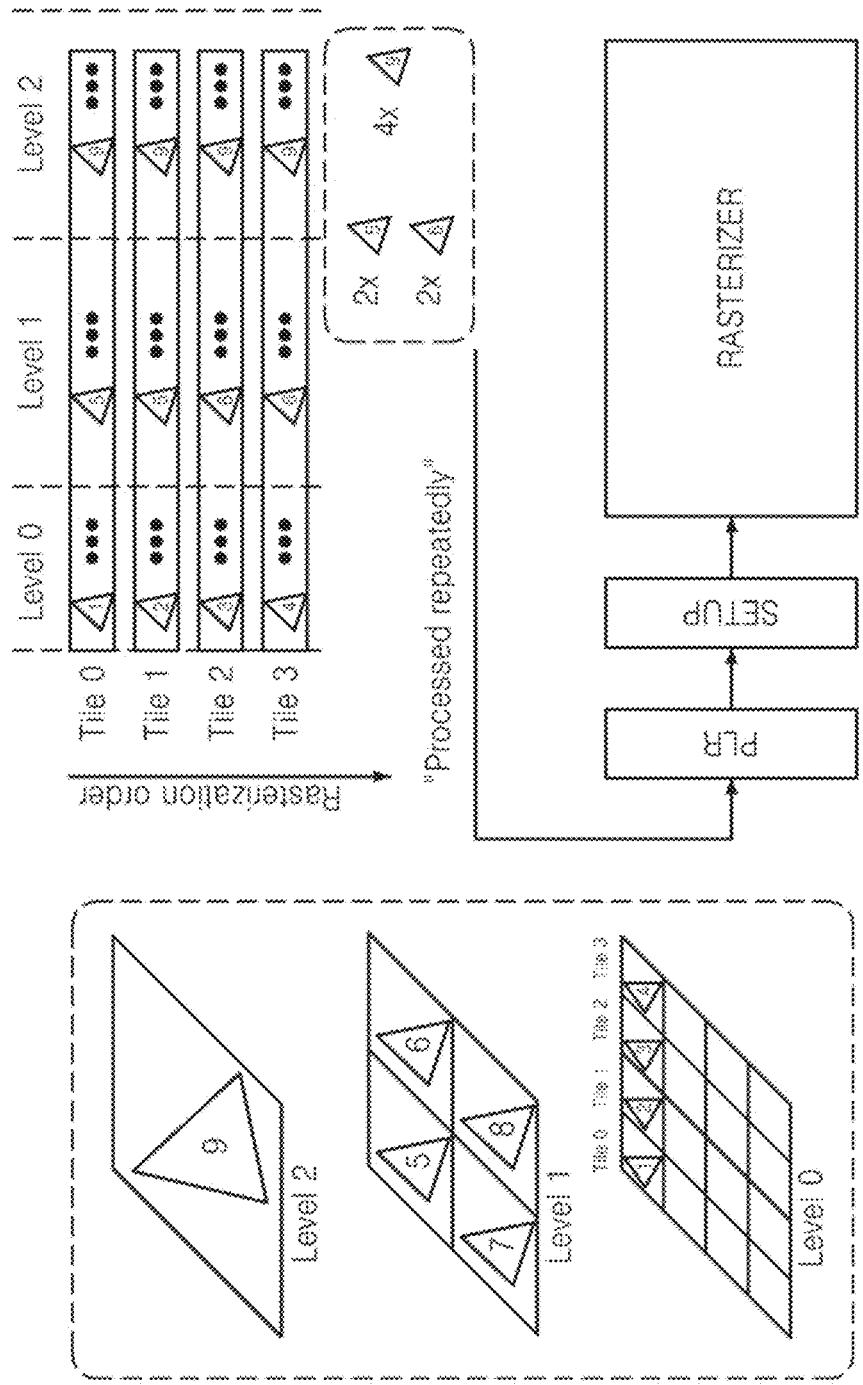
FIG. 8 illustrates an operation of a fragment processor when a hierarchical tiling technique according to a comparative example is used.

FIG. 8 illustrates an operation of a fragment processor when a hierarchical tiling technique according to a comparative example is used.

Referring to FIGS. 3 and 8, in the case in which the polygon is a triangle, a rasterization process is performed by loading triangles allocated to tiles of upper layers Level 1 and Level 2 while sequentially processing tiles Tile0, Tile1, Tile2, and Tile3 of a lowermost layer Level 0.

In this case, a setup and a rasterizer may repeatedly perform the same operation on the tiles belonging to the upper layers Level 1 and Level 2. Although not shown, such an inefficiency may occur in tiles belonging to the same layer, e.g., the lowermost layer Level 0.

Figure 9:
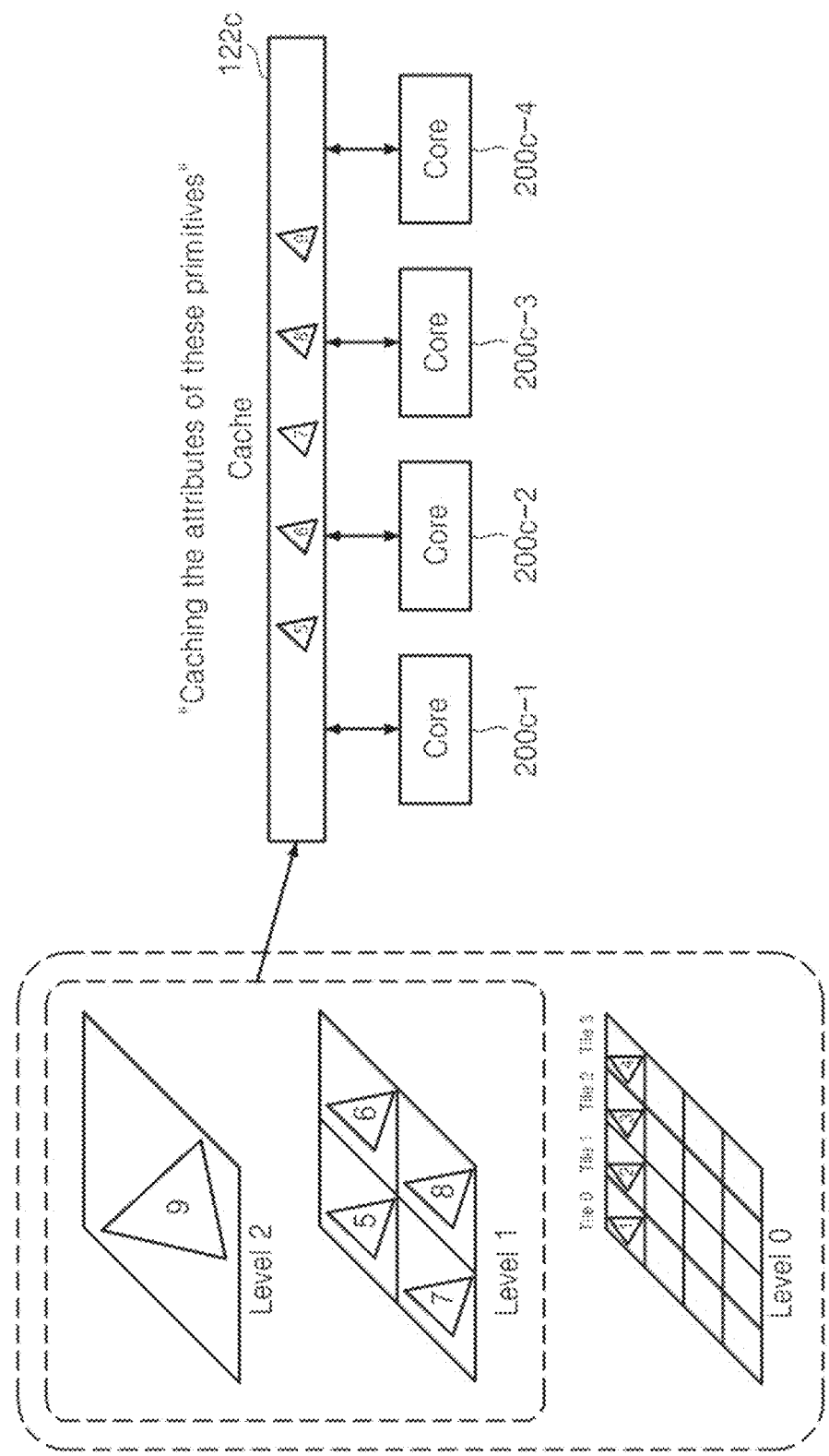
FIG. 9 is a conceptual diagram according to an exemplary embodiment.

FIG. 9 is a conceptual diagram according to an exemplary embodiment.

Referring to FIG. 9, again in the case in which the polygon is a triangle, information regarding the features of the triangle in a first tile belonging to upper layers Level 1 and Level 2 (e.g., either an interpolation coefficient or coverage information for lower tiles of the first tile) may be stored in a storage, e.g., a cache 122c.

Then, when one of cores 200c-1 to 200c-4 processes a second tile belonging to a lower layer Level 0, the one of the cores 200c-1 to 200c-4 may read the interpolation coefficient or the coverage information of the triangle from the cache 122c, and perform rasterization on the second tile based on the read interpolation coefficient or coverage information of the triangle.

FIG. 10 illustrates an example of coverage information generated according to an exemplary embodiment.

Referring to FIG. 10A, when the hierarchical tiling technique is used, in the case in which the polygon is a triangle, information regarding a triangle T allocated to tiles of an upper layer includes coverage information for tiles right below the triangle T. The coverage information may be determined by setting tiles, which are touched by a bounding box BB among tiles belonging to a layer right below a layer to which the triangle T belongs, to a first logic level, e.g., '1'.

This method is advantageous in terms of a simple calculation. However, using this method, it is possible that some tiles will be selected in the first tile group TG1 and set to '1' that overlap the bounding box BB but do not actually overlap the triangle T. For example, as shown in FIG. 10A, the boxes on the right-hand side are set to '1' because the bounding box BB overlaps the boxes on the right-hand side, but the boxes on the right-hand side are not included in the triangle T. Thus, when the tiles are processed, information regarding the triangle T is input to a rasterizer.

Turning to FIG. 10B, according to an exemplary embodiment, coverage information for not only tiles at a layer right below the triangle T (i.e., TG1) but also tiles at other layers below the triangle T (e.g., TG2, TG3) may be produced so as to prevent the information regarding the triangle T from being input to the rasterizer when tiles belonging to a second tile group TG2 are processed.

Also, coverage information may be produced by performing an in-out test on tiles for the triangle T instead of detecting regions of tiles at a lower layer that overlap the bounding box BB, thereby preventing information regarding the triangle T from being input to the rasterizer when tiles belonging to a third tile group TG3 are processed. Accordingly, an undesired operation may be prevented from being performed, thereby reducing power consumption.

Figure 11:
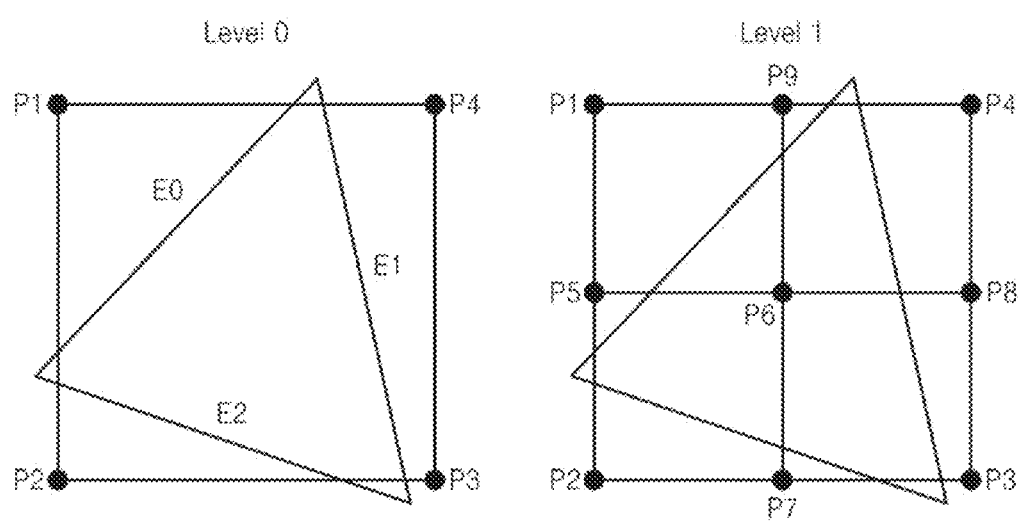
FIG. 11 is a diagram illustrating an in-out test according to an exemplary embodiment.

FIG. 11 is a diagram illustrating an in-out test according to an exemplary embodiment.

Referring to FIGS. 3 and 11, the coverage check information generator 211 may perform the in/out test. For example, in the case of a triangle, the coverage check information generator 211 may perform the in/out test on a tile of the triangle according to Equation 2 below by inputting the coordinates of four vertices of the tile to an edge function corresponding to three edges of the triangle.

$$E_0(x,y)=A_0x+B_0y+C_0>0,$$

$$E_1(x,y)=A_1x+B_1y+C_1>0,$$

$$E_2(x,y)=A_2x+B_2y+C_2>0. \quad \text{[Equation 2]}$$

In Equation 2, '$E_0(x,y)$', '$E_1(x,y)$', and '$E_2(x,y)$' denote edge functions at the (x,y) coordinates of the vertices of the tile, and '$A_0$', '$A_1$', '$A_2$', '$B_0$', '$B_1$', '$B_2$', '$C_0$', '$C_1$', and '$C_2$' denote constants that are set according to the features of the triangle.

The coverage check information generator 211 may determine that the vertices of the tile corresponding to the edge functions $E_0$, $E_1$, and $E_2$ are within the triangle when all of the edge functions $E_0$, $E_1$, and $E_2$ have positive values. The coverage check information generator 211 may determine that at least a portion of the tile is included in the triangle when at least one of the vertices of the tile is within the triangle.

The coverage check information generator 211 may perform the in-out test according to Equation 2 on vertices P1 to P4 to determine whether a tile of Level 0 is 'in'/'out', and additionally perform the in-out test according to Equation 2 on vertices P5 to P9 to determine whether four tiles of Level 1 are 'in'/'out'.

Figure 12:
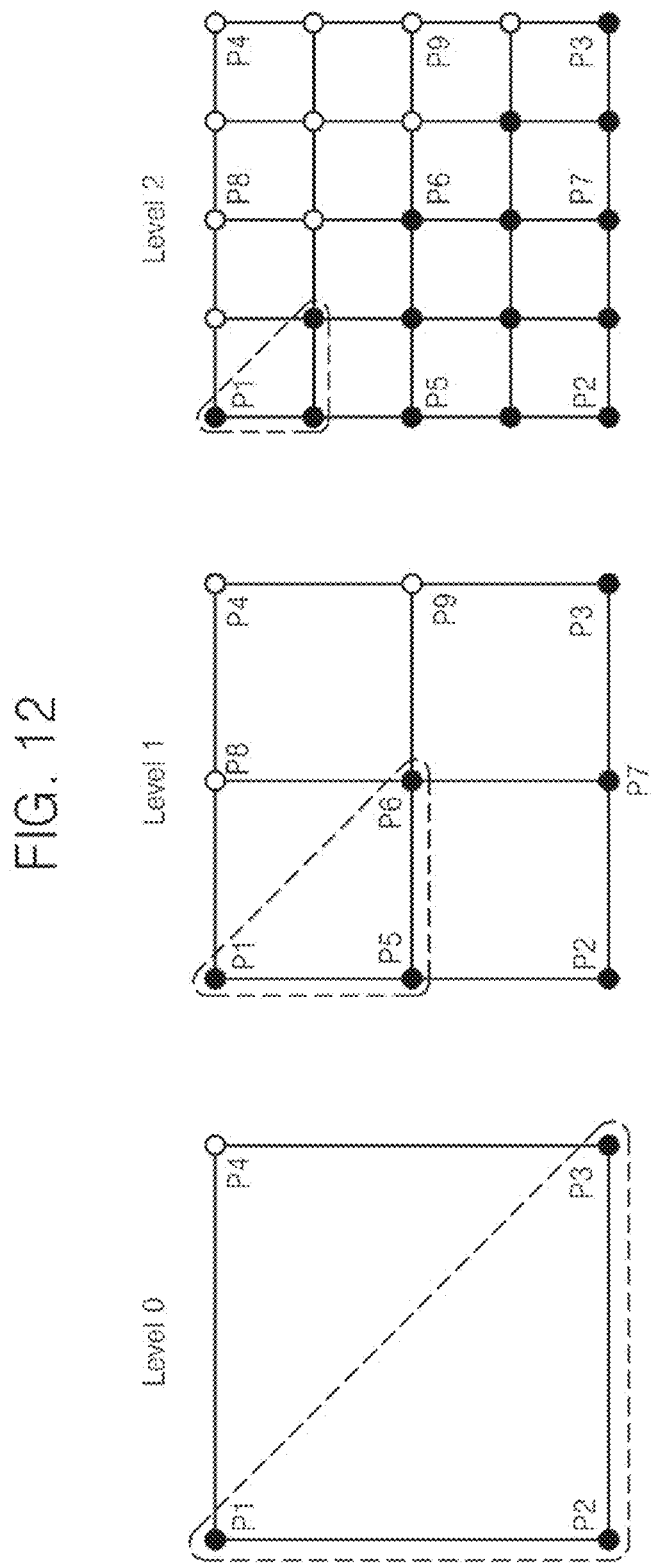
FIG. 12 is a diagram illustrating a method of calculating coverage information according to an exemplary embodiment.

FIG. 12 is a diagram illustrating a method of calculating coverage information according to an exemplary embodiment. Referring to FIGS. 3 and 12, the lower a level, the greater the number of tiles at the level. Thus, a number of times the in-out test is performed increases, thereby increasing load on hardware.

To address the increased load, the coverage check information generator 211 may calculate coverage information for a second tile, based on geometric information for the first tile of the triangle in the first tile.

It is assumed that a tile of Level 0 consisting of points P1, P2, P3, and P4 is a first tile and a tile of Level 1 constituting points P2, P5, P6, and P7 is a second tile.

In the case in which the polygon is a triangle, if it is determined through the in-out test that the points P1, P2, and P3 are within the triangle, the points P5, P6, and P7 between the points P1, P2, and P3 are also within the triangle according to the geometric features of the triangle.

Thus, in the related art, after determining whether a tile of Level 0 is 'in'/'out' is calculated, the in-out test is additionally performed on the five points P5 to P9 to calculate whether tiles of Level 1 are 'in'/'out'. By contrast, according to the exemplary embodiments, the in-out test is only additionally performed on the two points P8 and P9. Similarly, whether tiles of Level 2 and levels lower than Level 2 are 'in'/'out' may be calculated.

FIG. 13 illustrates in-out patterns for a tile of a primitive.

Referring to FIGS. 3 and 13, in the case in which the polygon is a triangle, when all of vertices of a tile are within a triangle (see FIG. 13(a)), the coverage check information generator 211 may determine that all of vertices of lower tiles of the tile are within the triangle.

When three vertices of the tile are within the triangle (see FIG. 13(b)), the in-out test may be performed on the lower tiles as described above with reference to FIG. 12.

When two vertices of the tile are within the triangle (see FIG. 13(c)), it may be determined that vertices of a lower tile of the tile, which are located on a segment connecting vertices within the triangle, are within the triangle.

In some exemplary embodiments, when the features (e.g., size or angle) of a triangle are limited, in-out information of the lower tiles may be inferred from the features of the triangle and an in-out pattern of the tile.

In some exemplary embodiments, when only lower vertices of the tile are within the triangle (see FIG. 13(c)), the coverage check information generator 211 may determine that a tile that meets an upper side of the tile does not belong to the triangle when tiles adjacent to the left and right sides of the tile have the same in-out pattern as the tile.

The coverage check information generator 211 may store in the form of a table or the like the patterns described above or other patterns (e.g., an in-out pattern illustrated in FIG. 13(d) or (e)).

According to the method described above, tile coverage information of a primitive may be obtained using less hardware resources, and the amount of calculation and power consumption may be lowered. This method may be used to calculate not only tile-based coverage but also pixel coverage of a tile consisting of a plurality of pixels.

Figure 14:
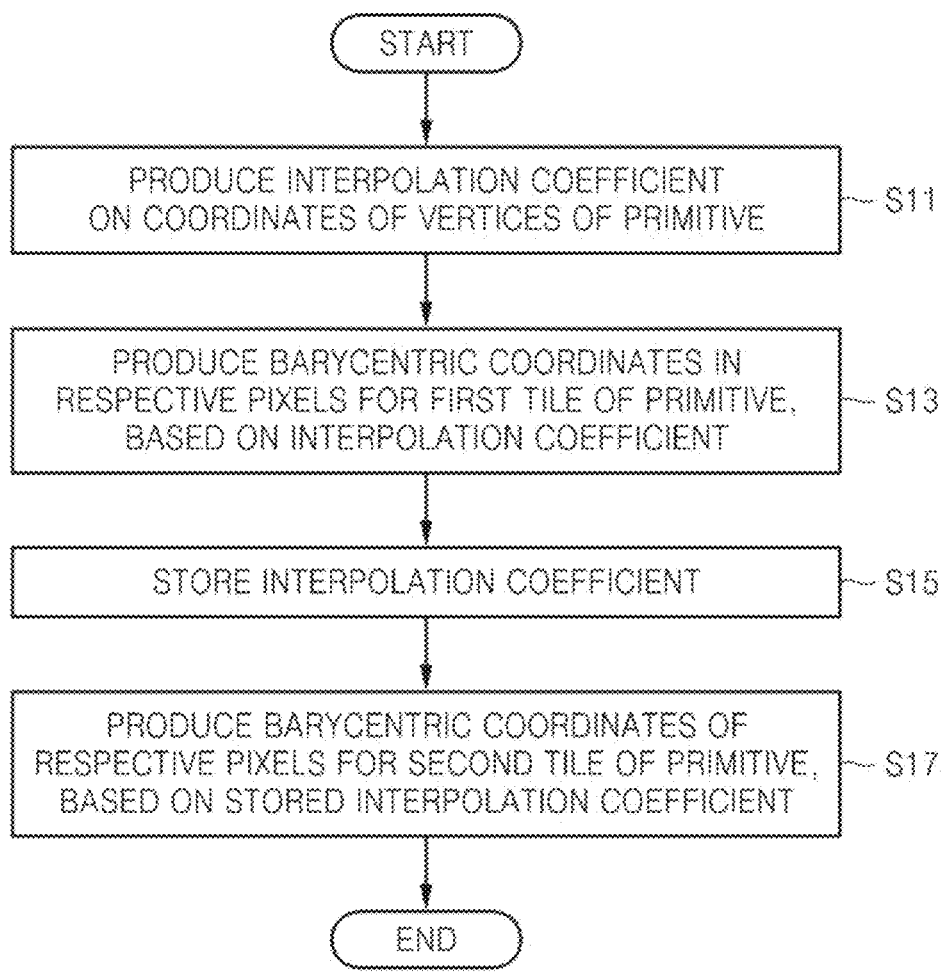
FIG. 14 is a flowchart of a graphics processing method according to an exemplary embodiment.

FIG. 14 is a flowchart of a graphic processing method according to an exemplary embodiment.

Referring to FIGS. 2, 3, 7, and 14, the coefficient generator 205 may produce an interpolation coefficient based on the coordinates of vertices of a primitive included in a first tile (operation S11).

The coefficient generator 205 may produce barycentric coordinates in respective pixels for the first tile of the primitive, based on the interpolation coefficient (operation S13).

The storage 220 may store the interpolation coefficient (operation S15).

The coefficient generator 205 may produce barycentric coordinates of respective pixels in a second tile including the primitive, based on the interpolation coefficient stored in the storage 220 (operation S17).

The second tile may be processed by a core that processes the first tile, or by another core. Thus, operation S17 may be performed by the coefficient generator 205 of the core that processes the first tile, or the coefficient generator 205 of another core.

Figure 15:
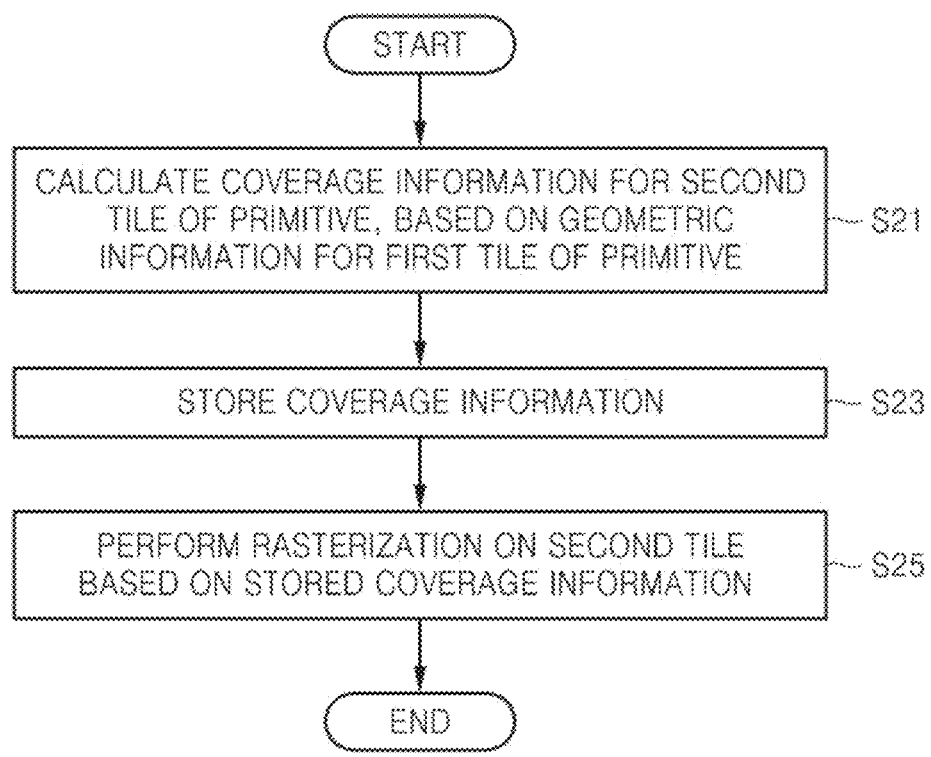
FIG. 15 is a flowchart of a graphics processing method according to another exemplary embodiment.

FIG. 15 is a flowchart of a graphic processing method according to another exemplary embodiment.

Referring to FIGS. 2, 3, 7, and 15, the coverage check information generator 211 may calculate coverage information for a second tile of a primitive, based on geometric information for the first tile of the primitive included in the first tile (operation S21).

The storage 220 may store the coverage information (operation S23).

The rasterizer 210 may perform rasterization on the second tile based on the stored coverage information (operation S25).

Operations S21 and S25 may be performed by a same core or by different cores.

In FIGS. 14 and 15, the first tile may be a tile that is larger in size than the second tile, includes the second tile, and is upper by N levels than the second tile. Here, 'N' denotes an integer that is equal to or greater than '1'. In some exemplary embodiments, the first tile may be a tile that is smaller in size than the second tile, is included in the second tile, and is lower by N levels than the second tile. In some exemplary embodiments, the first tile and the second tile may have the same size.

The present general inventive concept can also be embodied as computer-readable codes stored on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers in the art to which this invention belongs.

According to the one or more exemplary embodiments, graphics may be processed at a high speed with low power consumption by reducing undesired operations.

While the inventive concept has been particularly shown and described with reference to exemplary embodiments thereof, it will be understood that various changes in form and details may be made therein without departing from the spirit and scope of the following claims.

What is claimed is:

1. A graphics processing unit for performing rendering in units of tiles, the graphics processing unit comprising:
 a first coefficient generator configured to produce a first interpolation coefficient based on coordinates of primitive vertices of a primitive included in a first tile and a second tile;
 an interpolator configured to produce barycentric coordinates in respective pixels for the first tile of the primitive based on the first interpolation coefficient, and to perform a first interpolation based on the barycentric coordinates to produce pixel values of respective pixels in the first tile corresponding to the primitive; and
 a storage configured to store the first interpolation coefficient,
 wherein the interpolator produces barycentric coordinates in respective pixels for the second tile of the primitive based on the first interpolation coefficient stored in the storage, and performs a second interpolation based on the barycentric coordinates to produce pixel values of respective pixels in the second tile corresponding to the primitive, the second tile being a subtile that is smaller than and included within the first tile,
 wherein the graphics processing unit further comprises a coverage check information generator configured to, using vertex information indicating one or more first vertices of the first tile that are within the primitive, determine one or more second vertices of the second tile that are within the primitive based on geometric information of the primitive and the vertex information of the first tile, perform an in-out test only on remaining vertices of the second tile, and calculate coverage information for the second tile of the primitive that indicates whether the second tile is within the primitive, based on the one or more second vertices of the second tile that are determined to be within the primitive,
 wherein the storage further stores the coverage information, and
 wherein the graphics processing unit performs rasterization on the second tile based on the coverage information.

2. The graphics processing unit of claim 1, wherein the primitive vertices comprise at least two primitive vertices, and the first interpolation coefficient is a value based on a difference between the coordinates of the at least two primitive vertices of the primitive.

3. The graphics processing unit of claim 2, wherein the primitive is a triangle, and
 the first interpolation coefficient comprises at least one among N, |N|, N/|N|, (V1−V2), (V0−V1), and (V2−V0),
 wherein V0, V1, and V2 denote vectors corresponding to the at least two primitive vertices of the primitive,
 N denotes a vector that is equal to (V2−V0) ×(V1−V0), and
 |N| denotes a size of the vector N.

4. The graphics processing unit of claim 1, further comprising a depth information generator configured to calculate depth information for the first tile of the primitive,
 wherein the storage stores the depth information, and
 the graphics processing unit performs the rasterization on the second tile based on the depth information stored in the storage.

5. The graphics processing unit of claim 1, further comprising a second coefficient generator configured to produce a second interpolation coefficient based on the coordinates of the primitive vertices of the primitive included in the first tile and the second tile, and
 wherein the barycentric coordinates in the respective pixels in the second tile are produced based on the first interpolation coefficient produced by the first coefficient generator or the second interpolation coefficient produced by the second coefficient generator.

6. The graphics processing unit of claim 1, wherein the geometric information is information indicating whether the one or more first vertices of the first tile are within the primitive.

7. The graphics processing unit of claim 1, further configured to process the first tile and the second tile by using a same core or different cores.

8. The graphics processing unit of claim 1, wherein the storage is embodied as a cache memory or a buffer memory.

9. A graphics processing apparatus for performing rendering in units of tiles, the graphics processing apparatus comprising:
 a rasterizer configured to, using vertex information indicating one or more first vertices of a first tile that are within a primitive, determine one or more second vertices of a second tile that are within the primitive based on geometric features of the primitive and the vertex information of the first tile, the second tile being a subtile that is smaller than and included within the first tile, perform an in-out test only on remaining vertices of the second tile, and calculate coverage information for the second tile of the primitive that indicates whether the second tile is within the primitive, based on the one or more second vertices of the second tile that are determined to be within the primitive; and
 a storage configured to store the coverage information,
 wherein the rasterizer performs rasterization on the second tile, based on the coverage information stored in the storage.

10. The graphics processing apparatus of claim 9, wherein the second tile is a tile that is included in the first tile and is lower by N levels than the first tile,
 wherein N denotes an integer that is equal to or greater than '1'.

11. The graphics processing apparatus of claim 9, the coverage information is calculated and the rasterization is performed by using a same core or different cores.

12. The graphics processing apparatus of claim 9, wherein the rasterizer calculates depth information for the first tile of the primitive,
 the storage stores the depth information, and
 the rasterizer performs the rasterization on the second tile based on the depth information stored in the storage.

* * * * *